No. 726,542. PATENTED APR. 28, 1903.
S. G. KLOTZ.
WHEEL TIGHTENER.
APPLICATION FILED FEB. 9, 1903.
NO MODEL.

Witnesses
R. A. Boswell.
A. L. Hough

Inventor
S. G. Klotz,
By Franklin N. Hough
Attorney

UNITED STATES PATENT OFFICE.

SAMPSON G. KLOTZ, OF MOUNT VERNON, INDIANA.

WHEEL-TIGHTENER.

SPECIFICATION forming part of Letters Patent No. 726,542, dated April 28, 1903.

Application filed February 9, 1903. Serial No. 142,647. (No model.)

*To all whom it may concern:*

Be it known that I, SAMPSON G. KLOTZ, a citizen of the United States, residing at Mount Vernon, in the county of Posey and State of Indiana, have invented certain new and useful Improvements in Wheel-Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for tightening wheels; and it consists, essentially, in the provision of a means whereby the spokes of wheels may be forced out against the felly and rim, thus forcing the latter against the felly to tighten the wheel or of actuating the mechanism so as to allow for the shrinkage of the wheel, allowing the spokes to be driven by the shrinkage toward the hub.

More specifically my invention consists in the provision of a plate which is seated in a recess in the hub of the wheel and against which the inner ends of the spokes of a wheel are adapted to contact and in the provision of a tightening-nut mounted upon a threaded portion of a bolt secured to the spoke-engaging plate and adapted as the nut is screwed down upon the bolt to cause the plate to be drawn toward the outer ends of the spokes, thus drawing the same against the felly and the rim of a wheel.

My invention consists, further, in various details of construction and combinations of parts, which will be hereinafter fully described and then specifically defined in the appended claims.

My invention is illustrated in the accompanying drawings, which, with the letters of reference marked thereon, form a part of this application, and in which drawings—

Figure 1:
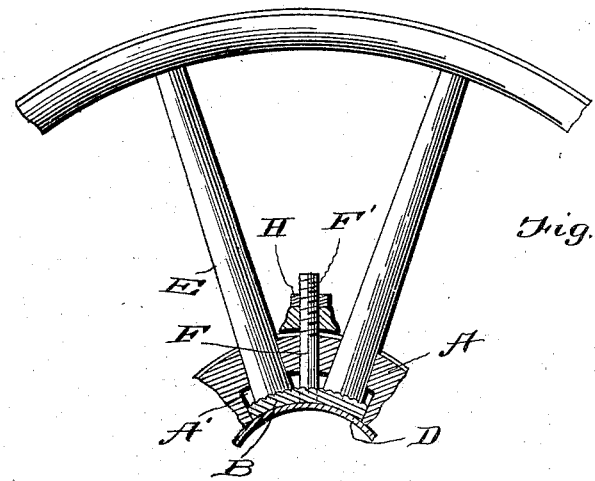
Figure 2:
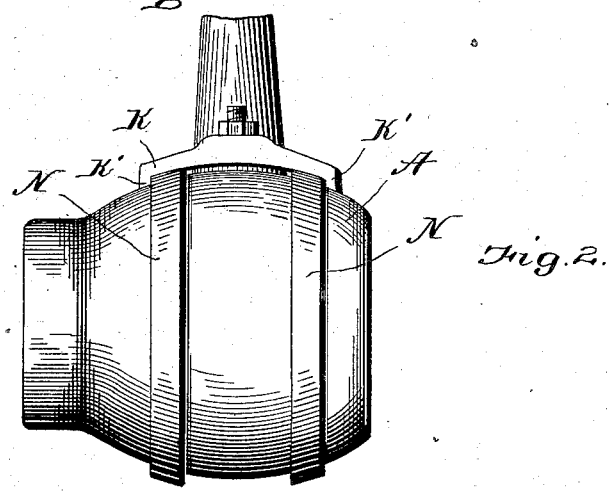
Figure 5:
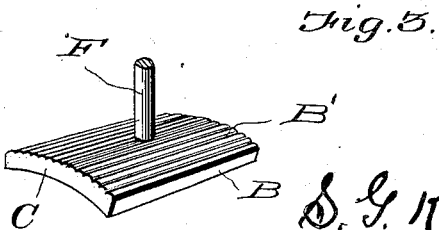

Figure 1 is a sectional view through a portion of the hub of a wheel, showing in elevation spokes held against the tightening-plate. Fig. 2 is an enlarged detail in side elevation of a portion of a hub, showing the clamping member held over the bands of a hub; and Fig. 3 is an enlarged detail view of the spoke-engaging plate carried within the hub of a wheel.

Reference now being had to the figures of the drawings by letter, A designates the hub of a wheel, and seated within a recessed or chambered portion A' of said hub is a plate B, an enlarged detail view of which is shown in Fig. 3 of the drawings, which plate has its inner surface concaved, as at C, and adapted to conform to the skein D, mounted in the bore of the hub, and against which skein said plate rests when at its inner limit. Said plate has corrugations B' upon its upper concaved surface, and against said corrugated surface the inner ends of the spokes E are adapted to contact, as shown in Fig. 1 of the drawings, after the spokes have been inserted in the apertures of the hub. Intermediate the spokes is a bolt F, the inner end of which may have a screw-threaded connection with the plate B or otherwise secured thereto and has threads F' about one end, upon which a tightening-screw H is fitted. A yoke K, having flanged ends K', which are inwardly bent, has an aperture adapted to receive the shank portion of the bolt F, and said flanges are adapted to engage against the hub at locations adjacent to the outer marginal edges of the hub-bands N, which pass about the hub in the manner disclosed in Fig. 2 of the drawings.

In operation when the wheel becomes loose from any cause incident to changes in the temperature the operator by screwing down upon the nut H will force the yoke K against the hub of the wheel and cause the plate B to be drawn toward the outer ends of the spokes, and with the outer movement of said plate the spokes will be forced against the felly and the felly in turn will be forced against the tire, thus securely tightening the parts of the wheel. If for any reason due to the effects of the elements upon the parts of the wheel the felly should shrink, the nut may be unscrewed and the plate and the spokes may be allowed to move slightly toward the center of the hub in order to relieve the strain upon the felly.

By the provision of an apparatus embodying my invention it will be observed that a wheel equipped with my adjusting apparatus may be at all times kept so that the parts will be tight and the proper dishing of the wheel retained at all times.

While I have shown a particular construction embodying the features of my invention, it will be understood that I may make alterations in the detailed construction of the same without departing from the spirit of the invention.

Having thus fully described my invention, what I claim as new, and desire to secure by Letters Patent, is—

1. An apparatus for tightening wheels, comprising a plate seated in a recess or chambered portion in the hub of a wheel and against which the inner ends of spokes are adapted to contact, a threaded bolt connected to said plate and extending through the wall of the hub, a yoke upon said bolt bearing on the hub, and a tightening-screw adapted to force said yoke against the hub, whereby the spokes are forced toward the felly of a wheel, as set forth.

2. An apparatus for tightening wheels, comprising a plate seated in a recess in the bore of a hub, the outer face of said plate being corrugated, the inner ends of the spokes adapted to bear against said corrugations, a bolt fastened to said plate and extending through the wall of the hub, a yoke upon said bolt, and a nut bearing against the yoke and adapted to force the same against the hub, as set forth.

3. An apparatus for tightening wheels, comprising a hub having a recessed portion in the wall of the bore of the hub, a plate positioned in said recess and having an outer concaved face against which the inner ends of spokes are adapted to contact, a bolt secured to the plate and extending through the wall of a hub, a yoke centrally apertured and fitted on said bolt and having flanged ends adapted to contact with the circumference of the hub, and a tightening-screw adapted to force said yoke against the hub to cause the spokes to be thrown toward the felly of a wheel, as set forth.

In testimony whereof I hereunto affix my signature in presence of two witnesses.

SAMPSON G. KLOTZ.

Witnesses:
VINCENT M. CARTWRIGHT,
HENRY J. KLOTZ.